(12) United States Patent
Cook et al.

(10) Patent No.: US 8,183,799 B2
(45) Date of Patent: May 22, 2012

(54) STARTER STOPPER FOR HIGH INTENSITY DISCHARGE LIGHTING

(75) Inventors: Jason Cook, Laurel, MS (US); Yulin Liang, Hattiesburg, MS (US)

(73) Assignee: Howard Industries, Inc., Laurel, MS (US)

( * ) Notice: Subject to any disclaimer, the term of this patent is extended or adjusted under 35 U.S.C. 154(b) by 653 days.

(21) Appl. No.: 12/360,249

(22) Filed: Jan. 27, 2009

(65) Prior Publication Data

US 2010/0188026 A1    Jul. 29, 2010

(51) Int. Cl.
  *H05B 37/02*    (2006.01)
  *H05B 39/04*    (2006.01)
  *H05B 41/36*    (2006.01)
(52) U.S. Cl. .............. 315/360; 315/119; 315/209 R; 315/307
(58) Field of Classification Search ............. 315/119, 315/DIG. 5, DIG. 7
See application file for complete search history.

(56) References Cited

U.S. PATENT DOCUMENTS

| | | |
|---|---|---|
| 3,681,653 A | 8/1972 | Snyder |
| 4,258,295 A | 3/1981 | Siglock |
| 4,414,600 A | 11/1983 | Schweickardt |
| 4,962,336 A | 10/1990 | Dodd |
| 5,530,301 A | 6/1996 | Fu et al. |
| 7,019,467 B2 | 3/2006 | Sokoly et al. |
| 2007/0024215 A1* | 2/2007 | Garbowicz et al. ........... 315/360 |
| 2008/0129216 A1 | 6/2008 | Fang et al. |

* cited by examiner

*Primary Examiner* — Shawki S Ismail
*Assistant Examiner* — Jany Tran
(74) *Attorney, Agent, or Firm* — Hoffmann & Baron, LLP (57) ABSTRACT

A starter stopper for use with a high intensity discharge (HID) lighting source includes a timer and switch. The timer controls the durations of on-time and off-time periods during an energizing period. The starter stopper connects the HID lighting source to power to start the HID lighting source during on-time periods, and disconnects the HID lighting source from the power to start the HID lighting source during off-time periods. A method of starting and stopping an HID lighting source includes initiating an energizing period in response to application of power to a starter stopper, enabling the HID lighting source to be connected to power to start the HID lighting source during on-time periods by the starter stopper, enabling the HID lighting source to be disconnected from the power to start the HID lighting source during off-time periods by the starter stopper, and stopping the energizing period in response to removal of the power to the starter stopper.

19 Claims, 8 Drawing Sheets

| Input | | Output |
|---|---|---|
| Pin 1 | Pin 2 | Pin 3 |
| 0 | 1 | 1 |
| 1 | 0 | 1 |
| 0 | 0 | 1 |
| 1 | 1 | 0 |

| Inputs | | | | | Outputs | |
|---|---|---|---|---|---|---|
| Set | Reset | cp | J | K | Q | Q̄ |
| H | L | X | X | X | 0 | $\bar{0}$ |
| L | H | X | X | X | H | L |
| H | H | X | X | X | L | H |
| Set | Reset | CP | J | K | H | H |
| L | L | ⌐_ | L | L | $Q_{n+1}$ | $\bar{Q}_{n+1}$ |
| L | L | ⌐_ | H | L | no change | no change |
| L | L | ⌐_ | L | H | H | L |
| L | L | ⌐_ | H | H | L | H |
| | | | | | $\bar{Q}_n$ | $Q_n$ |

STARTER STOPPER FOR HIGH INTENSITY DISCHARGE LIGHTING

BACKGROUND

1. Field

The present invention relates to a starter stopper circuit for high-intensity discharge (HID) Lighting sources and ballasts, which includes all pulse start ballasts, such as constant wattage autotransformer (CWA), high reactance auto transformer (HX), and reactor ballasts.

2. Brief Description of the Related Art

High intensity discharge (HID) lighting sources are key light sources for commercial and industrial applications, such as sports stadiums, warehouses, airports, and street lighting. HID lighting sources include mercury vapor, low-pressure sodium, high-pressure sodium, metal halide lamps, and their respective ballasts. HID lamps are widely used because they have a longer life and higher efficiency when compared with fluorescent and incandescent lamps.

Although the operating principle of all HID lamps are similar, the lamp type and wattage vary. Each lamp has a specific lamp current and voltage in a steady state. The ballast of each lamp not only maintains the lamp voltage and current in the steady state, but also produces a sufficient ignition voltage to start the lamp. Generally speaking, a higher wattage lamp requires a higher ignition voltage, thus requiring a larger ballast size. Magnetic HID ballasts represent the majority of HID ballasts.

Recently, electronic HID ballast development has become a trend. Electronic HID ballasts exhibit improved control of the ignition voltage and steady-state lamp power by using integrated circuits. Moreover, electronic HID ballasts can have a universal input voltage while keeping output wattage and light constant.

Commonly used magnetic ballasts include reactor, high reactance autotransformer (HX), and constant wattage autotransformer (CWA) ballasts. A reactor ballast is a single coil ballast. If the input voltage is high enough to start the particular HID lamp and maintain its steady state voltage, the reactor is chosen as a ballast. The advantage of the reactor ballast is that its cost is lower and it is easy to manufacture. An HX ballast is a two-coil ballast, which can step up the input voltage high enough to start an HID lamp. The power factors of both the reactor and HX ballasts can be improved from the normal 50% to a high-power factor 90% by adding a capacitor across the input terminals. Compared with the HX ballast, a CWA ballast has multiple inputs instead of one input and a capacitor in series between a secondary terminal and lamp load. A CWA ballast is the most widely used HID ballast for most applications. A CWA ballast is a high-power factor ballast.

In order to improve lumen efficiency, metal halide lamp structures were developed in the mid 1990s with modified chemistry and fill pressures. This innovation required a higher ignition voltage than the traditional metal halide lamp starting probe and its bimetallic switch could provide. A new device-starter was then developed and used in metal halide lamps. These kinds of lamps are called pulse-start metal halide lamps. The voltage pulse that a starter can generate can be as high as 4000 Vpk.

Since the voltage pulse of a starter is so high, a problem appears in their application. If a lamp comes to the end of its lamp life (cycling, broken, or otherwise no longer functional) and is not replaced in time, both ballast and starter components will bear continuous high voltage pulses until either the ballast, lamp or other fixture component is damaged. Lamp removal, as well as broken, damaged, or bad connections may also result in the same high-voltage stress failure. When the lamp fails and maintenance is not performed, the ballast inevitably fails. Ballast failure is expensive and inconvenient. Thus, one or more solutions to these problems would be advantageous.

SUMMARY

A starter stopper for use with a high intensity discharge (HID) lighting source is provided that includes a timer and a switch operatively connected to the timer. The timer controls the durations of on-time periods and off-time periods associated with the switch during an energizing period, which is initiated in response to power being applied to the starter stopper. The energizing period includes a plurality of on-time periods and a plurality of off-time periods. The starter stopper is configured to connect the HID lighting source to power to start the HID lighting source during the plurality of on-time periods in the energizing period, and to disconnect the HID lighting source from the power to start the HID lighting source during the plurality of off-time periods in the energizing period.

The starter stopper may also include a counter configured to count a quantity of on-time periods, a latch operatively coupled to a rectifier to control a maximum quantity of on-time periods during the energizing period, a voltage divider configured to be operatively coupled to a plurality of voltages, a rectifier operatively coupled to the voltage divider, and a reset circuit operatively coupled to the latch to control a state of the latch. The HID lighting source may include a constant wattage auto transformer (CWA) ballast, high reactance auto transformer (HX) ballast, and/or a reactor ballast. The voltage divider may be configured to be coupled to 120 VAC and/or 277 VAC, and may include two capacitors electrically coupled in series. The rectifier may translate AC power to DC power and include a diode bridge and at least one Zener diode. The switch may include a normally-open switch and/or a normally-closed switch. The timer may include at least one charging and discharging resistive capacitive (RC) circuit controlling the duration of the plurality of on-time and off-time periods during the energizing period.

The energizing period may include three (3) on-time periods and three (3) off-time periods. The plurality of on-time periods may include a first on-time period, a second on-time period, and a third on-time period, wherein the first on-time period has a duration of 6.5 minutes, the second on-time period has a duration of 3.0 minutes, the third on-time period has a duration of 3.0 minutes, and each of the off-time periods has a duration of 5.0 minutes. The energizing period may be initiated in response to power being applied to the starter stopper immediately following a momentary power off condition.

A method of starting and stopping a high intensity discharge (HID) lighting source is provided that includes initiating an energizing period in response to application of power to a starter stopper, enabling the HID lighting source to be connected to power to start the HID lighting source during a plurality of on-time periods by the starter stopper, enabling the HID lighting source to be disconnected from the power to start the HID lighting source during the off-time periods by the starter stopper, and stopping the energizing period in response to removal of power to the starter stopper. Each of the plurality of on-time periods are separated by an off-time period in the energizing period. The method may also include initiating the energizing period in response to power being applied to the starter stopper immediately following a momentary power off condition.

Other objects and features of the disclosed embodiments will become apparent from the following detailed description considered in conjunction with the accompanying drawings. It is to be understood, however, that the drawings are designed as an illustration only and not as a definition of the limits of the invention.

DETAILED DESCRIPTION

Electronic protection solutions apply a high-voltage pulse to an HID lamp for a set time interval by turning on the bilateral switch and removing the high-voltage pulse from the lamp by turning off the bilateral switch. The thermal protection solution is to place thermal protectors in series with the primary coil or the secondary coil to interrupt power flow when the temperature rises above preset value.

A starter stopper for a High Intensity Discharge (HID) ballast is provided that protects the HID ballast by disconnecting the starter if a lamp is not connected or a starter fails to start the lamp. There are two embodiments of the starter stopper. One embodiment exhibits a low-output voltage with a normally-closed switch, and the other exhibits a high-output voltage with a normally-open switch. The low-voltage starter stopper includes two (2) AC power inputs, a full-wave bridge rectifier, a solid state timer Integrated Circuit (IC), a JK flip-flop counter, a NAND gate latch, a transistor-resistor reset circuit, and the normally-closed switch. A combination of a photodiode array with MOSFET switches and control circuitry is controlled by an infrared LED. The high-voltage starter stopper is the same as the low-voltage starter stopper, except that the output of the normally-closed switch is replaced by a normally-open triac and triac driver. The optically-coupled triac is controlled by the infrared LED.

Solutions were developed to address some but not all of the issues with starter stoppers. U.S. Patent Publication No. US2007/0024215A1 to Garbowicz et al. describes an ignitor turn-off switch for ballasts of high-intensity discharge (HID) lamps that seeks to prevent damage to the ballasts by disconnecting the ignitor if a lamps has failed or is missing. The ignitor turn-off switch circuit includes an AC power source, a full-wave bridge rectifier circuit, voltage regulator circuit, timer, and triac driver. However, this approach does not sense momentary power off conditions of the ballast nor does it allow for a plurality of striking periods.

The starter stopper for HID ballasts in accordance with the present invention provides an improved ballast turn-off solution. The disclosed embodiments prevent ballast failure by removing high-voltage starter pulses according to a predetermined time and period. The starter stopper attempts to strike the HID lamp three times by turning the starter on before it totally turns off the starter for a specified length of time, then disables the starter until power to the fixture is cycled. The first on-time period is about 6.5 minutes. The other two on-time periods are about 3.0 minutes each. The off-time between two strikes is about 5.0 minutes. The total time including both on- and off-time periods is about 22.5 minutes. The starter stopper reduces the stress on the starter components during striking time since it turns the starter off twice. In addition, the starter stopper allows the system three chances to ignite the HID lamp. It is easier for a starter to ignite the lamp in the last two striking or on-time periods since the lamp has a longer time to cool down. In the event of a momentary power outage, HID lamps will not restrike immediately. It may take several minutes for an arc tube of the HID lamp to cool down enough for the lamp to restart. For this reason, the starter stopper tries to start the lamp three times over a specified period of time, thus reducing the duty cycle. Another advantage of the disclosed embodiment is that the starter stopper can work properly in very low temperature environments, in which some thermal protection solutions will not function.

Figure 1A:
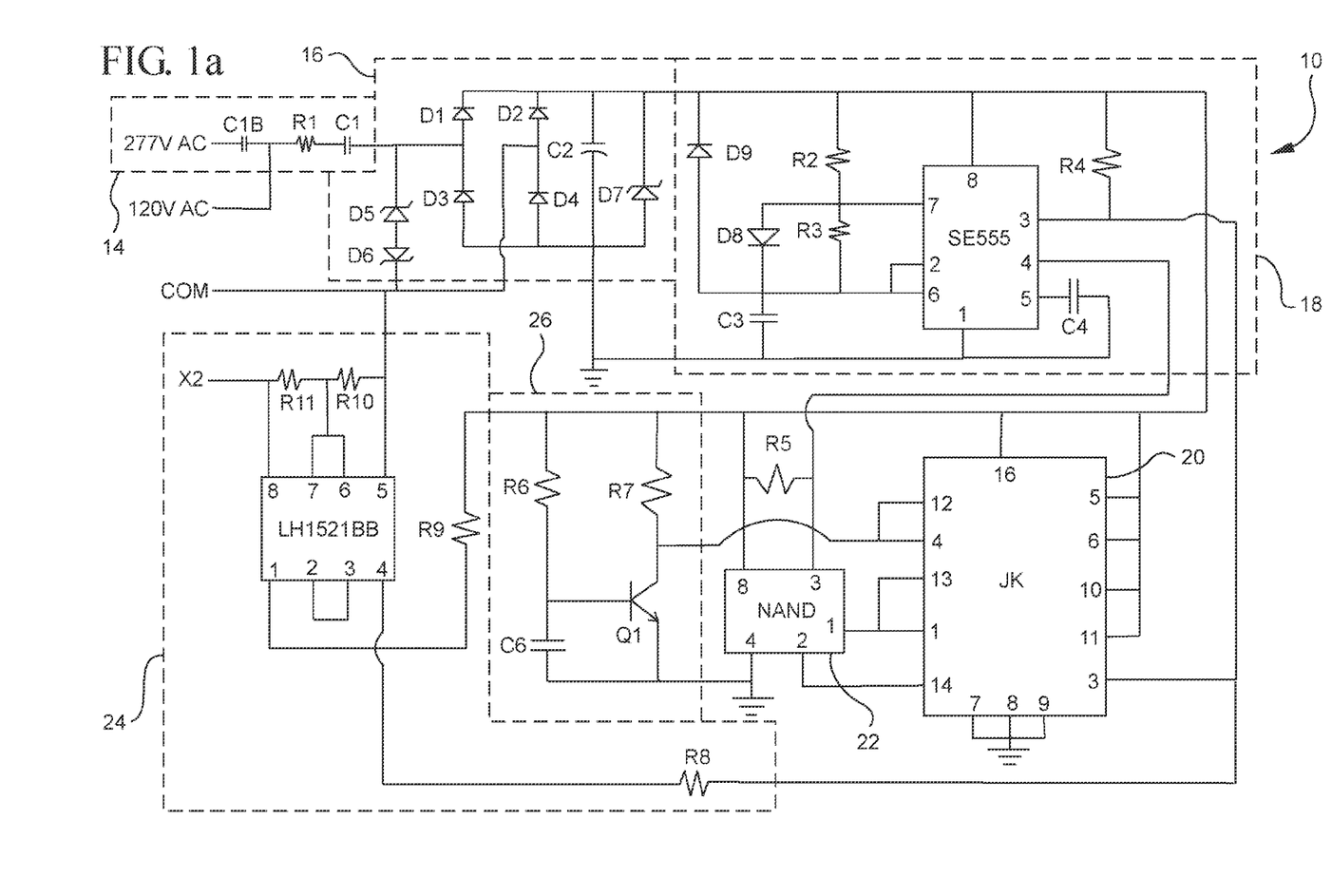
FIG. 1a is a schematic diagram of a first embodiment of a starter stopper (SS700NC), which incorporates a normally-closed switch.
Figure 1B:
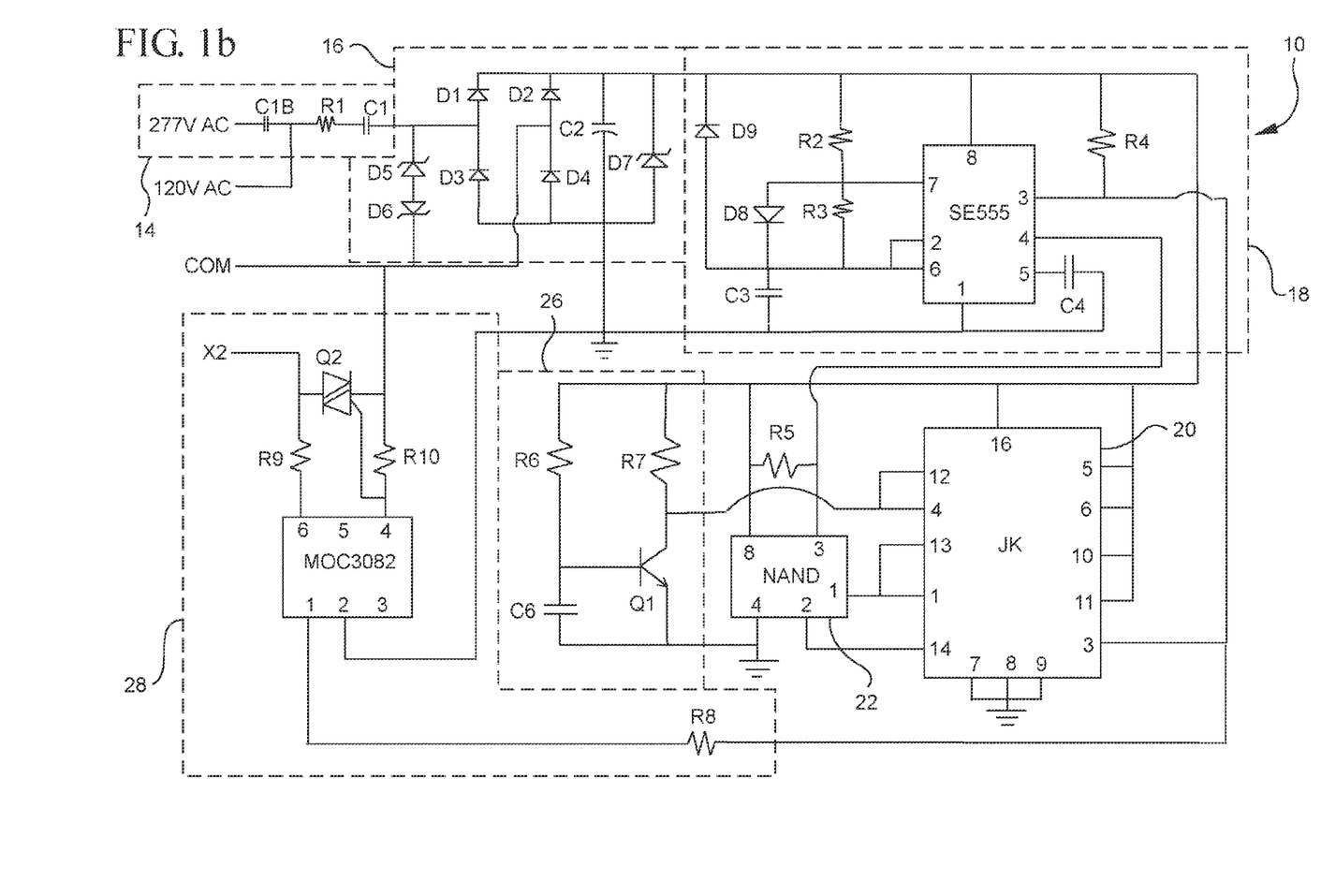
FIG. 1b is a schematic diagram of a second embodiment of a starter stopper (SS1000NO), which incorporates a normally-open switch.

The starter stopper 10,12 shown with a normally-closed switch in FIG. 1a and with a normally-open switch in FIG. 1b, controls a bi-lateral switch to prevent damage to the ballast and starter of a high intensity discharge (HID) lighting source. Input capacitors C1B, C1 are chosen to function both as a voltage divider for two input taps and as a current-limiting element for each individual input tap. A thermistor R1 connected in series between the two input capacitors C1B, C1 limits the inrush current. Before a full-wave bridge D1-D4, a Zener diode D5, D6 pair diverts extra peak voltage when the AC input is above the rated value of the Zener diodes. After the full-wave bridge D1-D4, both a Zener diode D7 and an electrolytic capacitor C2 function to maintain electrical characteristics required by the timer 18. The timer circuit 18 controls the output of the normally-closed switch 24. If the output switch is a normally-open switch 28, the timer 18 controls an output switch driver, and the switch driver controls the normally-open switch triac. In these cases, both the normally-closed and normally-open, a counter 20 will count the actions taken by the timer 18.

The counter 20 will shutdown the timer 18 after three ignitions. Each time the input AC power is on, the counter will first be reset by a reset circuit 26. In this way, the counter 20 always counts from zero (0). The number of striking time periods will be consistent at three (3) times.

Figure 2A:
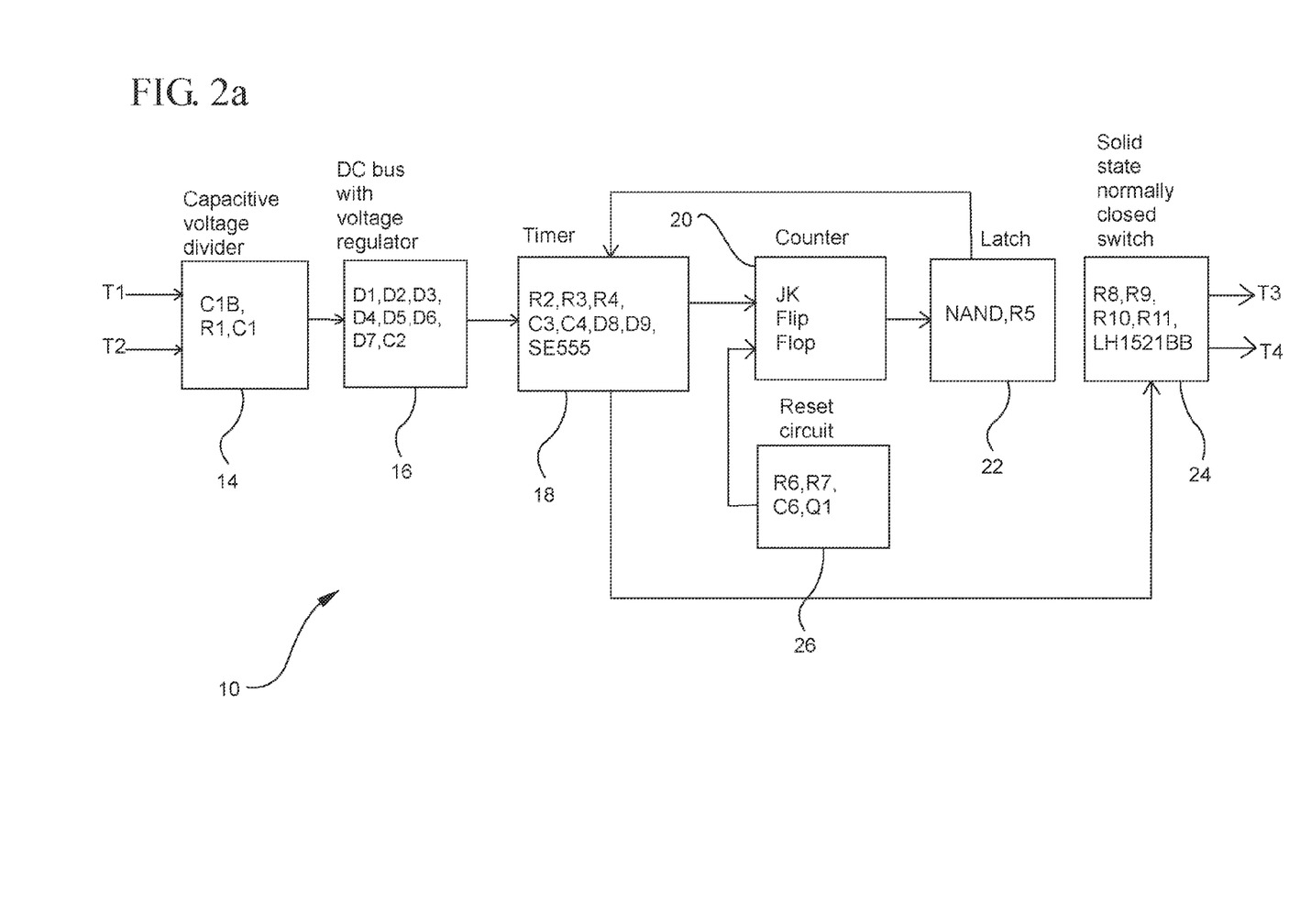
FIG. 2a is a functional block diagram of the first embodiment of the starter stopper (SS700NC).

The control process of the disclosed embodiments will be explained in more detail by describing seven (7) functional blocks of each embodiment shown in FIGS. 2a and 2b.

The details of the capacitive voltage divider block 14 shown in FIGS. 1a and 1b will now be described. T1 is a 277 VAC input voltage terminal. If the main input is 277V, T1 is connected to 277V and terminal T3 is connected to common ground. The input voltage is primarily dropped across capacitors C1B and C1. Some small portion, around 3V, drops across the thermistor R1. The high impedance of capacitors C1B and C1 limits current flowing into both the full bridge D1-D4 and the pair of Zener diodes D5, D6. T2 is a 120 VAC input terminal. If the main input is 120V, T2 is connected to 120V and common terminal T3 is connected to common ground. The input voltage is primarily dropped across capacitor C1. Some small portion, around 3V, drops across the thermistor R1. The capacitor C1 also functions as a current limiter.

The DC bus with voltage regulator 16 includes two Zener diodes D5, D6 that function as a voltage chopper. If the input voltage is positive to diode D5, diode D5 will have a voltage drop of 12V as rated, and diode D6 will have a forward voltage drop of 0.7V. The total voltage will be 12.7V. The extra voltage above 12.7V is limited by the two Zener diodes D5, D6. After the full bridge diodes D1-D4, the voltage is chopped off one more time to 12V by Zener diode D7. Two voltage chopping circuits are arranged before and after the full bridge D1-D4 so that inrush current stress on the latter part of the circuit can be reduced. After the full bridge D1-D4, the DC bus voltage is maintained and stabilized by electrolytic capacitor C2.

The details of the timer 18 operation will now be described. The control portion of the timer operation includes an IC chip SE555. The DC bus is connected to the power supply pin 8 of the SE555. Pin 1 is connected to rectified ground. A charging circuit includes resistor R2, diode D8, and capacitor C3. A charging time constant is given by $\tau_c = R2*C3$, which is used to control the on-time of the switch. The discharging circuit includes resistor R3 and capacitor C3. A discharging time constant is given by $\tau_c = R3*C3$, which is used to control the off-time of the switch.

The capacitor C4 connected to pin 5 is a noise filter, which helps the start-up of the timer chip SE555. The resistor R4 functions as a current limiter to the current flowing into pin 3 when output pin 3 of the timer chip SE555 is low. Trigger pin 2 is connected to threshold pin 6 in order to have a continuous output at pin 3. Reset pin 4 is controlled by the output of the NAND gate 22 (HFC40107B). The signal at pin 4 determines the state of the timer chip SE555. If the reset is high, the SE555 will continue switching. If the reset is low, the timer chip SE555 will stop working. Diode D9 is used to discharge the timing capacitor C3 when the main input AC is off, which results in the DC bus going low. Thus, when the main AC power is on, the timer chip SE555 can start over again. This function allows the starter stopper in accordance with the present embodiment to momentarily power off because of, for example, a lightning surge. Otherwise, the timer 18 will be stuck in a state that results in an open switch and the lamp will remain off.

Figure 3:
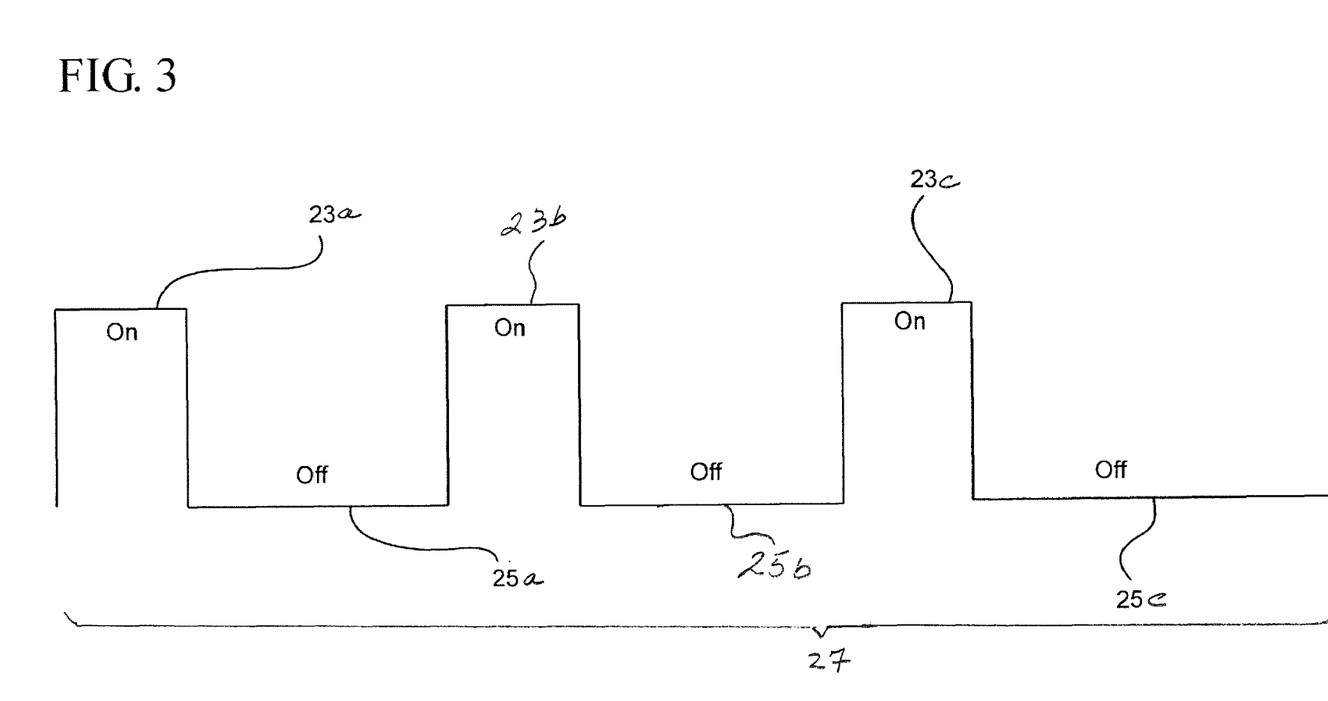
FIG. 3 is a timing diagram of the starter stoppers (SS700NC/SS1000NO).

The details of a dual JK flip flop 24 (HEF4027B) will now be discussed. The dual JK flip flop 24 functions as a counter. Power supply pin 16 is connected to the DC bus. Reference ground pin 8 is connected to rectified ground. Input J1 pin 5, K1 pin 6, J2 pin 10, and K2 pin 11 are connected to the DC bus. Set pin 7 and set pin 9 are connected to rectified ground. Trigger pulse pin 3 of the first flip flop is connected to output pin 3 of the timer chip SE555. Trigger pulse pin 13 of the second (slave) flip flop is connected to the output pin 1 of the first (master) flip flop. Pin 2 and pin 15 are left unconnected. Reset pin 4 and pin 12 are connected to the reset circuit. Output pin 1 of the first (master) flip flop and output pin 14 of the second (slave) flip flop are connected to the two inputs of the NAND gate 22. FIG. 3 is a timing diagram of the starter stopper SS700NC/SS1000NO X2 output, which shows the three (3) on-time periods 23 a-c, during which attempts are made to start the HID lamp, separated by off-time periods 25 a-c during an energizing period 27. The energizing period is initiated in response to power being applied to the starter stopper. The starter stopper is configured to connect the HID lighting source to power to start the HID lighting source during the plurality of on-time periods in the energizing period. The starter stopper is configured to disconnect the HID lighting source from the power to stop the HID lighting source during the plurality of off-time periods in the energizing period. The energizing period is stopped in response to power being removed from the starter stopper.

Figure 5:
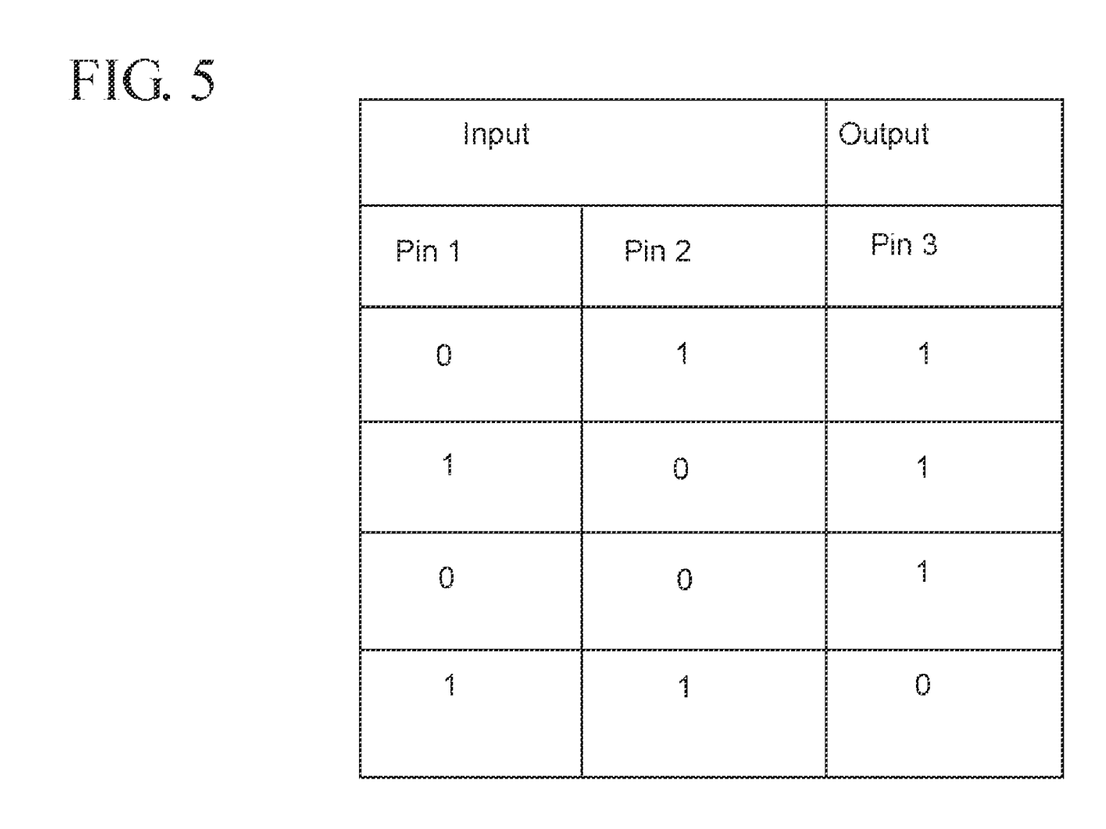
FIG. 5 is a truth table of a NAND gate.

The details of the NAND gate will now be described. FIG. 5 shows that the NAND gate 22 output pin 3 is one (1) or high until the counter 22 counts up to three (3). Then, its output is zero (0) when it counts to four (4). This low output (zero) is used as a signal to shut down the timer 18. Once the timer 18 shuts down, the JK flip flop 24 does not have any triggering signal, and the JK flip flop 24 does not count. Thus, the NAND gate 22 will be latched at zero (0) or low until the main power is reset or cycled.

Figure 6:
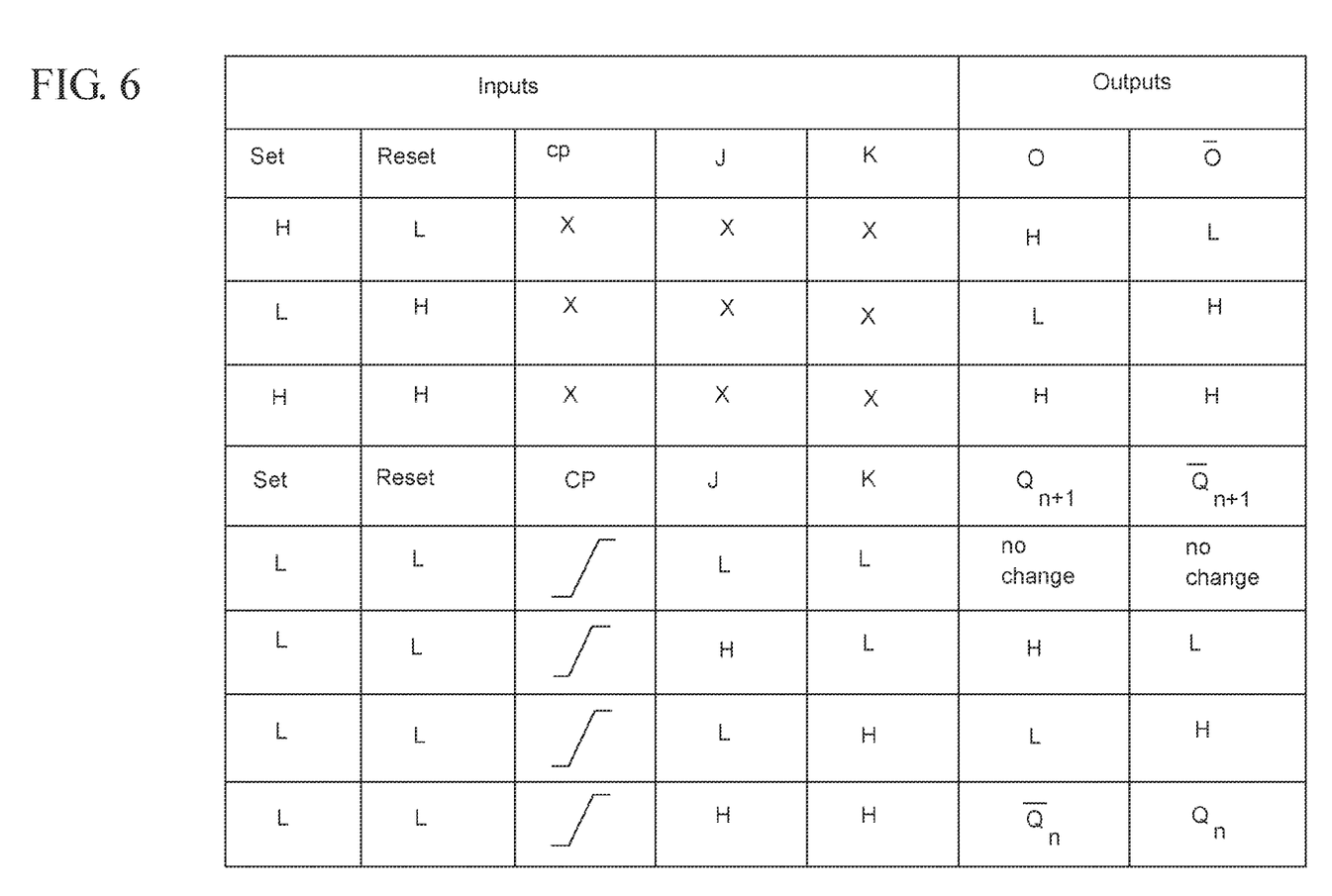
FIG. 6 is a truth table of a JK flip-flop and reset circuit.

The details of the reset circuit will now be described. The reset circuit 26 includes transistor Q1, resistors R6, R7, and capacitor C6. FIG. 6 is a truth table of the reset circuit. Whenever the main AC power supply is connected, the DC bus will be on. As long as the DC bus is on, the collector of transistor Q1 will sense the DC bus through resistor R7, which also becomes high. Meanwhile, the transition Q1 base drive capacitor C6 is charged through resistor R6 by the DC bus. When the capacitor C6 is charged to a threshold voltage (normally 0.6V) of the base drive, Q1 conducts, the collector of Q1 is pulled low, and the dual JK flip flop 20 is reset. The logic will switch from the second row of the function table in FIG. 6 to the last row. The next state $Q_{n+1}$ of the output pin 14 is then equal to the current state $Q_n$ not. Thus, the dual JK flip flop 20 functions as a counter and continues counting.

The details of the solid state output switches 24, 28 will now be described. In one embodiment shown in FIGS. 1a and 2a, the output switch 24 includes a normally closed switch LH1521BB, which is a dual Form B solid state relay. Actuation control is via an infrared LED. The output switch 24 is a combination of a photodiode array with MOSFET switches and a control circuit. An anode pin 1 of the infrared LED is connected to the DC bus through resistor R9. A cathode pin 4 of the infrared LED is connected to output pin 3 of the timer chip SE555. When output pin 3 of the timer chip SE555 is high, there is no control signal for the switch LH1521BB, and the switch will be closed. An X2 terminal is connected to power ground and the starter will work normally with the ballast. When the output pin 3 of the timer chip is low, the DC bus, through resistor R9, turns the infrared LED on. In this case, the output switch is triggered and turned off, and the starter's X2 terminal is disconnected. The starter is thus out of the circuit. Resistors R8 and R9 are electrically connected in series with the control signal. These two resistors determine the proper current value, which is high enough to turn the infrared LED on and low enough to keep the switch from being driven by too much current. Resistors R10 and R11 are voltage dividers. With these two resistors, the output voltage will drop evenly across two MOSFET switches. Each MOSFET switch is rated for 350V peak, or a total of 700V peak.

Figure 2B:
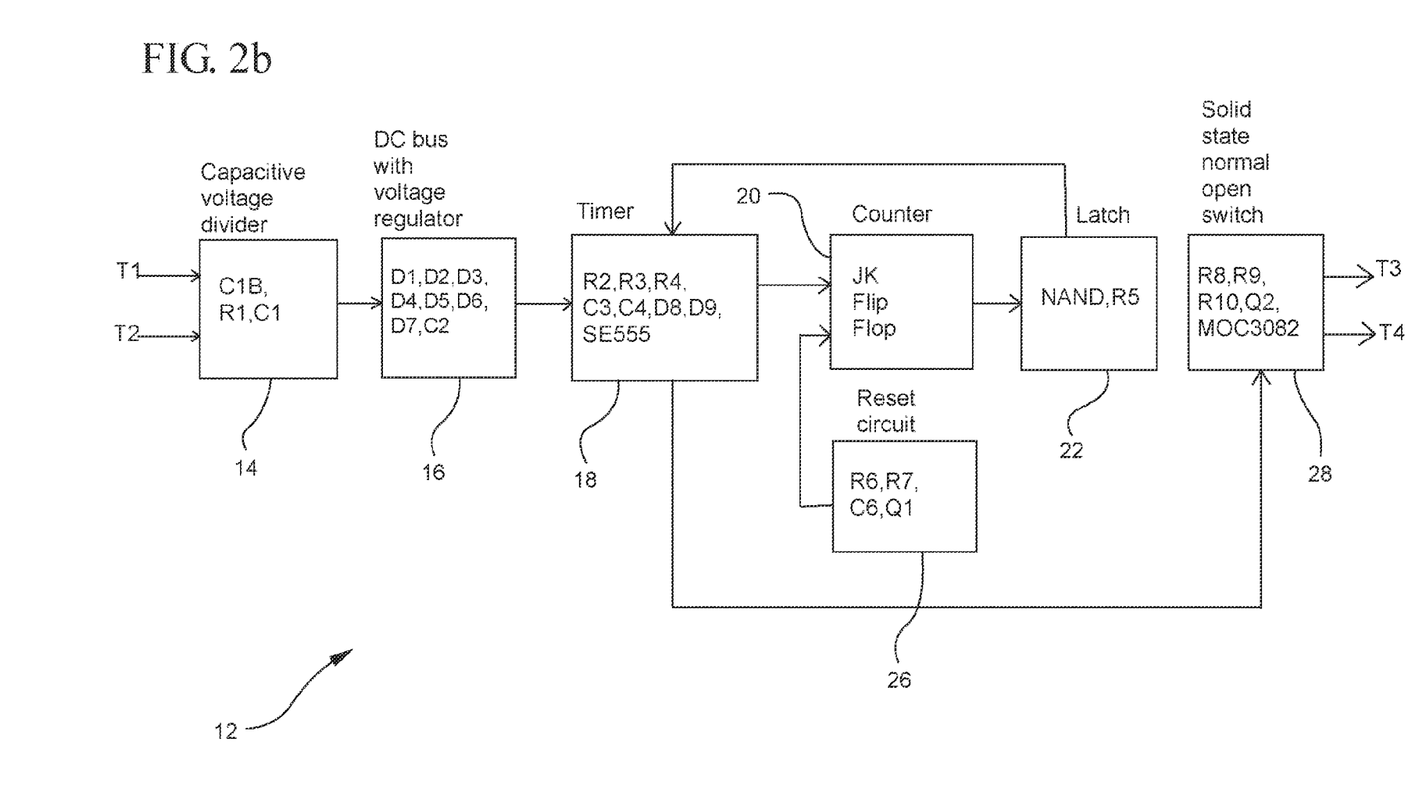
FIG. 2b is a functional block diagram of the second embodiment of the starter stopper (SS1000NO).

In the other embodiment, shown in FIGS. 1b and 2b, a triac driver MOC3082 drives a triac Q2 QK008LH4. The input control of the MOC3082 is an infrared LED. The output of the MOC3082 is a monolithic silicon detector with a zero-crossing circuit, which can drive the triac Q2. An anode pin 4 of the infrared LED is connected to an output pin 3 of the timer chip SE555 through the resistor R8. A cathode pin 5 is connected to rectified DC ground. Pin 2 and pin 6 are left unconnected. Pin 3 is connected to MT2 of the triac Q2 through resistor R9. Pin 1 is connected to the gate drive of the triac Q2. Pin 1 is also connected to MT1 of the triac through resistor R10. The triac Q2 QK008LH4 is rated at 1000V peak. When the output pin 3 of the timer chip SE555 is high, the input infrared LED of the MOC3082 is turned on. The output switch QK008LH4 is then triggered and closed and the X2 terminal is connected to power ground. The starter then energizes or strikes the lamp. When output pin 3 of the timer chip SE555 is low, there is no control signal for the triac driver MOC3082, the triac remains open, and the starter represents an open circuit between the starter and common ground.

The parts list for the circuits shown in FIGS. 1a, 1b, (normally closed-switch and normally-open switch embodiments, respectively) are provided in Table 1.

| No. | Designator | Description | Qty |
|---|---|---|---|
| | | Parts List of SS700NC (FIG. 1a) | |
| 1 | C1B | 2.2 uF, 400 V | 1 |
| 2 | C1 | 3.3 uF, 250 V | 1 |
| 3 | C2 | 22 uF, 50 V | 1 |
| 4 | C3 | 22 uF, 10 V, X5R, SMD, 1210, 10% | 1 |
| 5 | C4, C5 | 10 nF, 50 V, X7R, SMD, 0805, 20% | 2 |
| 6 | C6 | 560 nF, 16 v, X7R, 0805, 10% | 1 |
| 7 | R1 | MF72-80D9, 80 ohm, 20% | 1 |
| 8 | R2 | 15M ohm 1%, 0805 | 1 |
| 9 | R3 | 22M ohm 5%, 0805 | 1 |
| 10 | R4, R5, R7 | 11k ohm 1%, 0805 | 3 |
| 11 | R6 | 1M ohm 1%, 0805 | 1 |
| 12 | R8 | 200 ohm 1%, 0805 | 1 |
| 13 | R9 | 2k, 5%, 1/8 W, 0805 | 1 |
| 14 | R10, 11 | 30M, 0.5 W, 5% | 2 |
| 15 | D1-D4 | Diode 200 V, 1 A | 4 |
| 16 | D5-D7 | Zener 12 V, 2 W | 3 |
| 17 | D8, D9 | BAU116W, 90 V, 215 mA | 2 |
| 18 | U1 | SE555, 125 C. | 1 |
| 19 | U2 | JK reference temperature | 1 |
| 20 | U3 | NAND 2IN/1OUT (HFC 40107B) | 1 |
| 21 | U4 | LH1521BB, 700 V, 0.875Iout | 1 |
| 22 | Q1 | NPN transistor | 1 |
| | | Parts List of SS1000NO (FIG. 1b) | |
| 1 | C1B | 2.2 uF, 400 V | 1 |
| 2 | C1 | 3.3 uF, 250 V | 1 |
| 3 | C2 | 22 uF, 50 V | 1 |
| 4 | C3 | 22 uF, 10 V, X5R, SMD, 1210, 10% | 1 |
| 5 | C4, C5 | 10 nF, 50 V, X7R, SMD, 0805, 20% | 2 |
| 6 | C6 | 560 nF, 16 v, X7R, 0805, 10% | 1 |
| 7 | R1 | MF72-80D9, 80 ohm, 20% | 1 |
| 8 | R2 | 15M ohm, 5%, 0805 | 1 |
| 9 | R3 | 22M ohm, 5%, 0805 | 1 |
| 10 | R4, R5, R7 | 11k ohm, 1%, 0805 | 3 |
| 11 | R6 | 1M ohm, 1%, 0805 | 1 |
| 12 | R8 | 1K ohm, 1%, 0805 | 1 |
| 13 | R9 | 360 Ohm, 1/8 W, 150 V, 1%, 0805 | 1 |
| 14 | R10 | 330 Ohm, 1/8 W, 150 V, 1%, 0805 | 1 |
| 15 | D1-D4 | Diode 200 V, 1 A | 4 |
| 16 | D5-D7 | Zener 12 V, 2 W | 3 |
| 17 | D8, D9 | BAU116W, 90 V, 215 mA | 2 |
| 18 | U1 | SE555, 125 C. | 1 |
| 19 | U2 | JK reference temperature | 1 |
| 20 | U3 | NAND 2IN/1OUT (HFC 40107B) | 1 |
| 21 | U4 | MOC 3082 | 1 |
| 22 | Q1 | NPN TRANSISTOR | 1 |
| 23 | Q2 | Triac, 1000 V, 8 A, TO220 | 1 |

Figure 4:
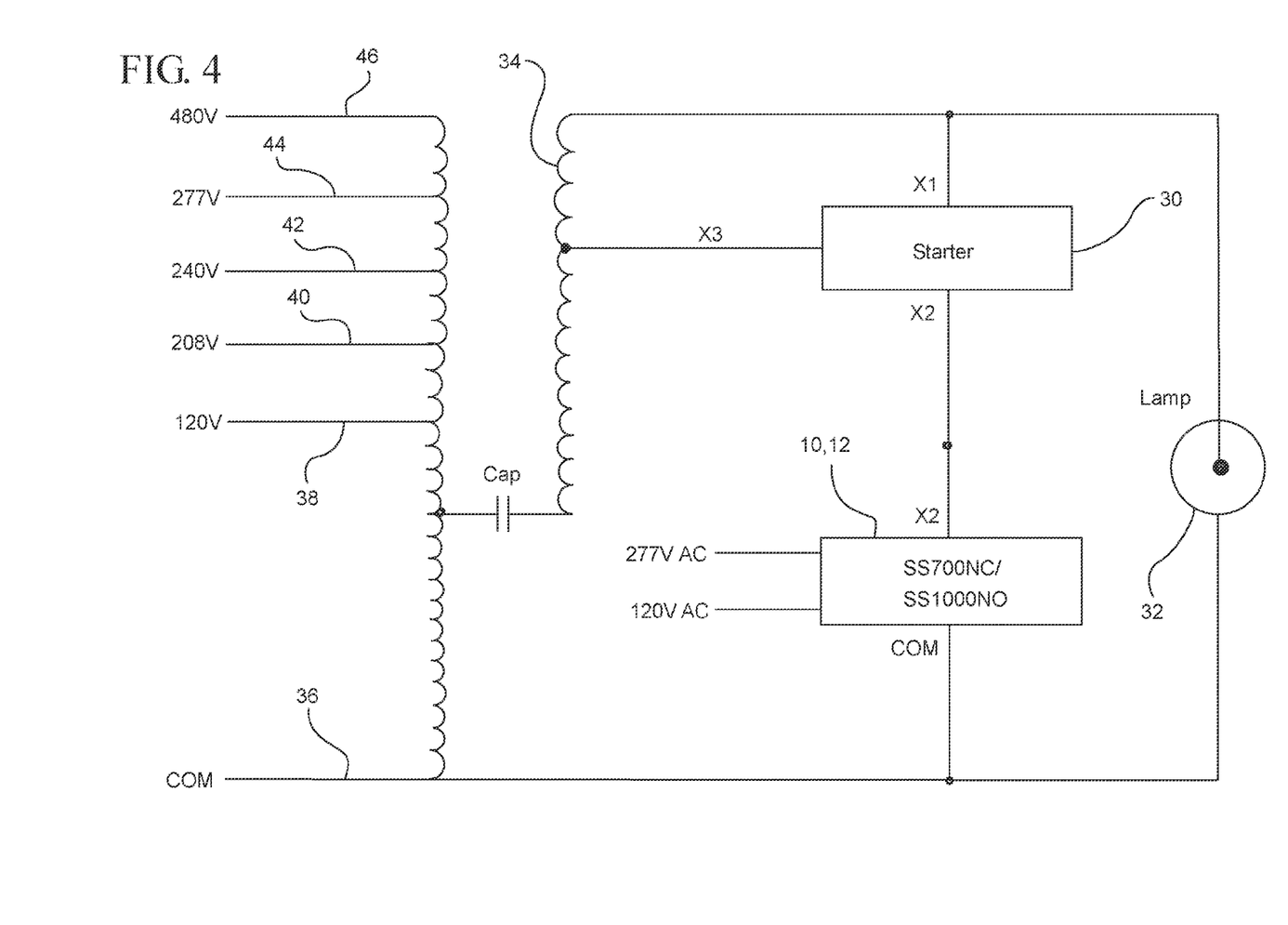
FIG. 4 is a schematic diagram of an application of the starter stoppers (SS700NC/SS1000NO).

FIG. 4 is a schematic diagram of an application of the starter stopper embodiments 10, 12. Either 120V or 277V is applied to the starter stopper 10, 12, the X2 terminal of which is connected to an X2 terminal of the starter 30. An X1 terminal of the starter 30 is connected to one terminal of a lamp ballast 32, and the common terminal of the starter stopper 10, 12 is connected to the remaining terminal of the lamp ballast 32. An X3 terminal of the starter 30 is connected to a secondary coil tap of a transformer 34. Primary taps of the transformer 34 are connected to common, 120V, 208V, 240V, 277V, or 480V.

Thus, the disclosed embodiments provide a starter stopper for HID ballasts, such as CWA, HX, and reactor ballasts. The main portions of the embodiments are 1) a capacitor voltage divider 14, which allows two inputs into the circuit, one being 120 VAC, and the other being 277 VAC; 2) a DC bus with a voltage regulator 16, which is a full-wave bridge with Zener diodes before and after the bridge; 3) a timer 18, which determines the on- and off-time period of the switch, and drives the output switch; 4) a JK flip flop counter 20, which counts the number of switching cycles (3); 5) a counter reset circuit 26, which determines the initial state of the counter 20; 6) a NAND gate latch circuit 22, that disables the timer 20 when the set number 4 is reached, the timer is latched off, and no switching action is given until the main power is reset; and 7) a solid state normally-closed switch 24 or solid state normally-open switch 28. The normally-closed switch 24 LH1521BB is preferably rated for 700V peak output voltage. The normally-open switch 28 QK008LH4 is preferably rated for 1000V peak output voltage. The starter operates when the switch is closed. Otherwise, the starter will be disconnected. At this point, if an HID lamp is missing, comes to an end of its life, or a connection between the lamp and the lamp holder is loosened, the ballast and the starter are protected.

The circuit can advantageously sense a momentary power off condition (such as a lightning strike) and restart the circuit with a new energizing period after the power is resumed, as if the power had been shutoff and turned on under normal conditions. Thus, the lighting system will reset very quickly after a momentary power outage. For example, when a momentary power off condition occurs, the DC bus voltage (Vc2) will be low. The timing capacitor C3 will be discharged by the diode D9. In this way, when the power is restored, the timer SE555 will start over again, as in a normal power cycling (power is turned off followed by power is turned on again) had occurred over a far greater length of time, due to the capacitor C3 having little or no stored voltage (i.e., a reset condition). However, if the timing capacitor C3 were not discharged during the momentary power off condition period, the timer SE555 would not start a new energizing period once power is restored, as is done in conventional starter stoppers, which will lockout (or maintain an open circuit, between the starter and ground) following a momentary power off condition.

Thus, the starter stopper of the present invention responds to a momentary power off condition in the same way it responds to a normal power down/power on cycle, which is by initiating an energizing period with on-time periods and off-time periods. A momentary power off condition is defined herein as power being removed only for a duration of that which can be achieved by manual selection (the switch being initially on, then turned off, then turned on again) of a switch, such as, for example only, in the order of milliseconds.

The following modifications are intended to be within the scope of the present invention:

1. any number, duration, and/or arrangement of on-time periods and off-time periods within an energizing sequence, following which power must be cycled (turned-off) before the starter can again be energized;

2. equal or unequal durations of on-time periods within an energizing sequence, following which power must be cycled (turned-off) before the starter can again be energized;

3. equal or unequal durations of off-time periods within an energizing sequence, following which power must be cycled (turned-off) before the starter can again be energized;

4. equal or unequal voltage and/or current levels applied to the starter during on time periods and/or off-time periods within an energizing sequence, following which power must be cycled (turned-off) before the starter can again be energized; and 5. an active multi-input voltage divider.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A starter stopper for use with a high intensity discharge (HID) lighting source, the starter stopper comprising:
   a timer;
   a switch operatively connected to the timer, the timer controlling a duration of a plurality of on-time periods and a duration of a plurality of off-time periods during an energizing period, the energizing period being initiated in response to power being applied to the starter stopper, the starter stopper being configured to connect the HID lighting source to power to start the HID lighting source during the plurality of on-time periods in the energizing period, the starter stopper being configured to disconnect the HID lighting source from the power to stop the HID lighting source during the plurality of off-time periods in the energizing period, the energizing period being stopped in response to power being removed from the starter stopper;
   a counter configured to count a quantity of the on-time periods; and
   a latch operatively coupled to the counter, the latch controlling a maximum quantity of on-time periods during the energizing period.

2. The starter stopper for use with a high intensity discharge (HID) lighting source defined by claim 1, further comprising:
   a voltage divider configured to be operatively coupled to a plurality of input voltages; and
   a rectifier operatively coupled to the voltage divider.

3. The starter stopper configured for use with a high intensity discharge (HID) lighting source defined by claim 2, wherein the voltage divider is configured to be operatively coupled to at least one of 120VAC and 277VAC.

4. The starter stopper configured for use with a high intensity discharge (HID) lighting source defined by claim 2, wherein the voltage divider includes two capacitors electrically coupled in series.

5. The starter stopper configured for use with a high intensity discharge (HID) lighting source defined by claim 2, wherein the rectifier translates AC power to DC power, the rectifier including a diode bridge and at least one Zener diode.

6. The starter stopper configured for use with a high intensity discharge (HID) lighting source defined by claim 1, wherein the energizing period is initiated in response to power being applied to the starter stopper immediately following a momentary power off condition.

7. The starter stopper configured for use with a high intensity discharge (HID) lighting source defined by claim 1, wherein the high intensity discharge lighting source includes at least one of a constant wattage auto transformer (CWA) ballast, a high reactance auto transformer (HX) ballast, and a reactor ballast.

8. The starter stopper configured for use with a high intensity discharge (HID) lighting source defined by claim 1, wherein the switch includes at least one of a normally-open switch and a normally-closed switch.

9. The starter stopper configured for use with a high intensity discharge (HID) lighting source defined by claim 1, wherein the timer includes at least one charging and discharging resistive capacitive (RC) circuit, the at least one charging and discharging RC circuit controlling the duration of at least one of the plurality of on-time periods and the plurality of off-time periods during the energizing period.

10. The starter stopper configured for use with a high intensity discharge (HID) lighting source defined by claim 1, wherein the energizing period includes three (3) on-time periods.

11. The starter stopper configured for use with a high intensity discharge (HID) lighting source defined by claim 1, wherein the plurality of on-time periods include a first on-time period, a second on-time period, and a third on-time period, the first on-time period having a duration of 6.5 minutes, the second on-time period having a duration of 3.0 minutes, and the third on-time period having a duration of 3.0 minutes, each of the plurality of off-time periods having a duration of 5.0 minutes.

12. The starter stopper configured for use with a high intensity discharge lighting source defined by claim 1, wherein the energizing period includes three (3) off-time periods.

13. A method of starting and stopping a high intensity discharge (HID) lighting source comprising:
    initiating an energizing period in response to application of power to a starter stopper;
    enabling the HID lighting source to be connected to power to start the HID lighting source during a plurality of on-time periods by the starter stopper, the energizing period including the plurality of on-time periods and a plurality of off-time periods, each of the plurality of on-time periods being separated by at least one of the plurality of off-time periods;
    enabling the HID lighting source to be disconnected from the power to stop the HID lighting source during the plurality of off-time periods by the starter stopper;
    stopping the energizing period in response to power being removed from the starter stopper;
    counting a quantity of the on-time periods; and
    controlling a maximum quantity of on-time periods during the energizing period based on the quantity of on-time periods counted.

14. The method of starting and stopping a high intensity discharge (HID) lighting source defined by claim 13, wherein the HID lighting source includes at least one of a constant wattage auto transformer (CWA) ballast, a high reactance auto transformer (HX) ballast, and a reactor ballast.

15. The method of starting and stopping a high intensity discharge (HID) lighting source defined by claim 13, further comprising inputting at least one of 120VAC and 277VAC.

16. The method of starting and stopping a high intensity discharge (HID) lighting source defined by claim 13, wherein the energizing period includes three (3) on-time periods.

17. The method of starting and stopping a high intensity discharge (HID) lighting source defined by claim 13, wherein the plurality of on-time periods includes a first on-time period, a second on-time period, and a third on-time period, the first on-time period having a duration of 6.5 minutes, the second on-time period having a duration of 3.0 minutes, and the third on-time period having a duration of 3.0 minutes, each of the plurality of off-time periods having a duration of 5.0 minutes.

18. The method of starting and stopping a high intensity discharge (HID) lighting source defined by claim 13, wherein the energizing period includes three (3) off-time periods.

19. The method of starting and stopping a high intensity discharge (HID) lighting source defined by claim 13, wherein initiating the energizing period further comprises initiating the energizing period in response to application of power to the starter stopper immediately following a momentary power off condition.

* * * * *

UNITED STATES PATENT AND TRADEMARK OFFICE
CERTIFICATE OF CORRECTION

PATENT NO. : 8,183,799 B2 Page 1 of 1
APPLICATION NO. : 12/360249
DATED : May 22, 2012
INVENTOR(S) : Cook et al.

It is certified that error appears in the above-identified patent and that said Letters Patent is hereby corrected as shown below:

Title page, item (54) and Column 1, line 1, Title:

Now reads: "Starter Stopper for High Intensity Discharge Lighting"

Should read: -- Starter Stopper Circuit for High Intensity Discharge Lighting --

Signed and Sealed this
Twenty-eighth Day of August, 2012

David J. Kappos
*Director of the United States Patent and Trademark Office*